United States Patent
Kim et al.

(10) Patent No.: US 9,613,403 B2
(45) Date of Patent: Apr. 4, 2017

(54) IMAGE PROCESSING APPARATUS AND METHOD

(71) Applicant: Samsung Electronics Co., Ltd., Suwon-si, Gyeonggi-do (KR)

(72) Inventors: Sun Kwon Kim, Suwon-si (KR); Kee Chang Lee, Yongin-si (KR); Ouk Choi, Yongin-si (KR); Do Kyoon Kim, Seongnam-si (KR); Chang Yeong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 14/229,088

(22) Filed: Mar. 28, 2014

(65) Prior Publication Data
US 2014/0294299 A1    Oct. 2, 2014

(30) Foreign Application Priority Data
Mar. 28, 2013  (KR) .................. 10-2013-0033186

(51) Int. Cl.
*G06K 9/00* (2006.01)
*G06T 5/00* (2006.01)
*G06T 5/50* (2006.01)

(52) U.S. Cl.
CPC .............. *G06T 5/002* (2013.01); *G06T 5/50* (2013.01); *G06T 2207/10024* (2013.01); *G06T 2207/10028* (2013.01); *G06T 2207/20012* (2013.01); *G06T 2207/20092* (2013.01); *G06T 2207/30196* (2013.01)

(58) Field of Classification Search
CPC . G06T 5/50; G06T 5/002; G06T 2207/10028; G06T 2207/20028; G06T 2207/10024; G06T 2207/10052; G06T 2207/30196; G06T 2207/20012; G06T 2207/20092; G06T 2203/04808; H04N 13/0275; H04N 13/0018; H04N 13/0239; H04N 13/0271; H04N 13/0285; H04N 13/0296; H04N 5/225; H04N 5/2353; H04N 5/2354; H04N 5/332; H04N 19/0009; H04N 19/50; H04N 19/91; H04N 19/182; H04N 19/85; H04N 19/176; H04N 19/149; H04N 19/124; H04N 19/14; H04N 19/88
USPC ....................................... 382/167
See application file for complete search history.

(56) References Cited

U.S. PATENT DOCUMENTS

| | | |
|---|---|---|
| 6,252,997 B1 | 6/2001 | Miura et al. |
| 7,961,970 B1 | 6/2011 | Georgiev |
| 8,237,849 B2 | 8/2012 | Tanaka |

(Continued)

FOREIGN PATENT DOCUMENTS

| | | |
|---|---|---|
| JP | 2010-68018 A | 3/2010 |
| JP | 4900723 B2 | 3/2012 |

(Continued)

*Primary Examiner* — Ali Bayat
(74) *Attorney, Agent, or Firm* — NSIP Law

(57) ABSTRACT

An apparatus and method for out-focusing a color image based on a depth image, the method including receiving an input of a depth region of interest (ROI) desired to be in focus for performing out-focusing in the depth image, and applying different blur models to pixels corresponding to the depth ROI, and pixels corresponding to a region, other than the depth ROI, in the color image, thereby performing out-focusing on the depth ROI.

22 Claims, 16 Drawing Sheets

(56) References Cited

U.S. PATENT DOCUMENTS

| | | | |
|---|---|---|---|
| 2008/0143739 A1* | 6/2008 | Harris | G09G 5/02 |
| | | | 345/604 |
| 2008/0174678 A1* | 7/2008 | Solomon | G02B 27/0025 |
| | | | 348/231.99 |
| 2009/0002365 A1* | 1/2009 | Kurabayashi | G06T 5/002 |
| | | | 345/419 |
| 2009/0079862 A1 | 3/2009 | Subbotin | |
| 2009/0316014 A1 | 12/2009 | Lim et al. | |
| 2010/0194921 A1 | 8/2010 | Yoshioka | |
| 2010/0310165 A1 | 12/2010 | Chen et al. | |
| 2011/0085741 A1 | 4/2011 | Zhang et al. | |
| 2011/0169994 A1 | 7/2011 | DiFrancesco et al. | |
| 2012/0301044 A1* | 11/2012 | Nakada | H04N 5/23229 |
| | | | 382/255 |

FOREIGN PATENT DOCUMENTS

| | | |
|---|---|---|
| KR | 10-0657522 B1 | 12/2006 |
| KR | 10-0801088 B1 | 2/2008 |
| KR | 10-2009-0088022 A | 8/2009 |
| KR | 10-2010-0121944 A | 11/2010 |
| KR | 10-2011-0015452 | 2/2011 |
| KR | 10-2011-0082736 A | 7/2011 |
| KR | 10-2011-0109574 A | 10/2011 |
| WO | 2009/149413 A1 | 12/2009 |

\* cited by examiner

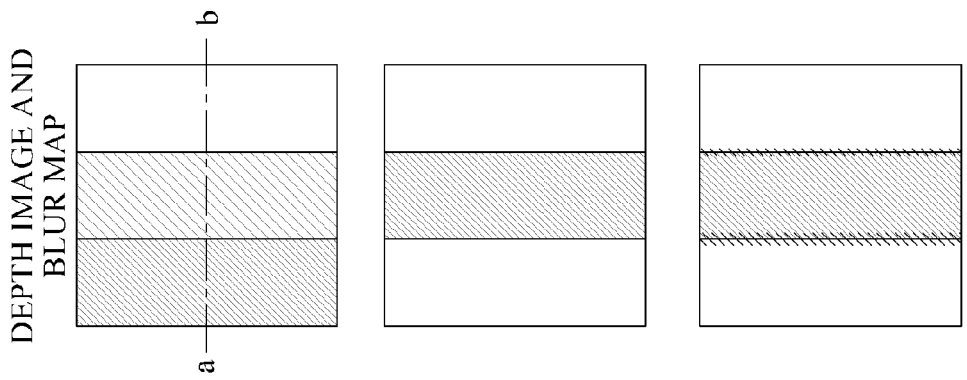
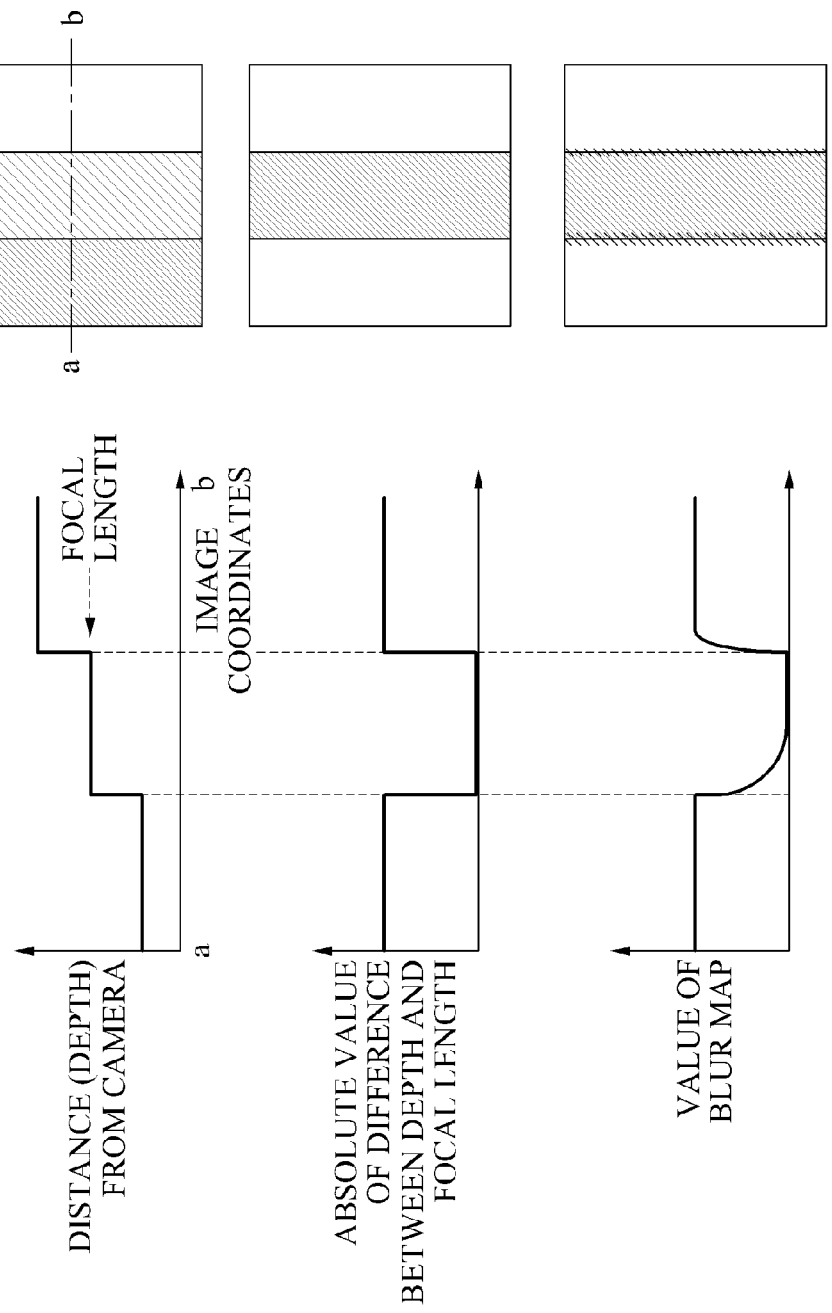

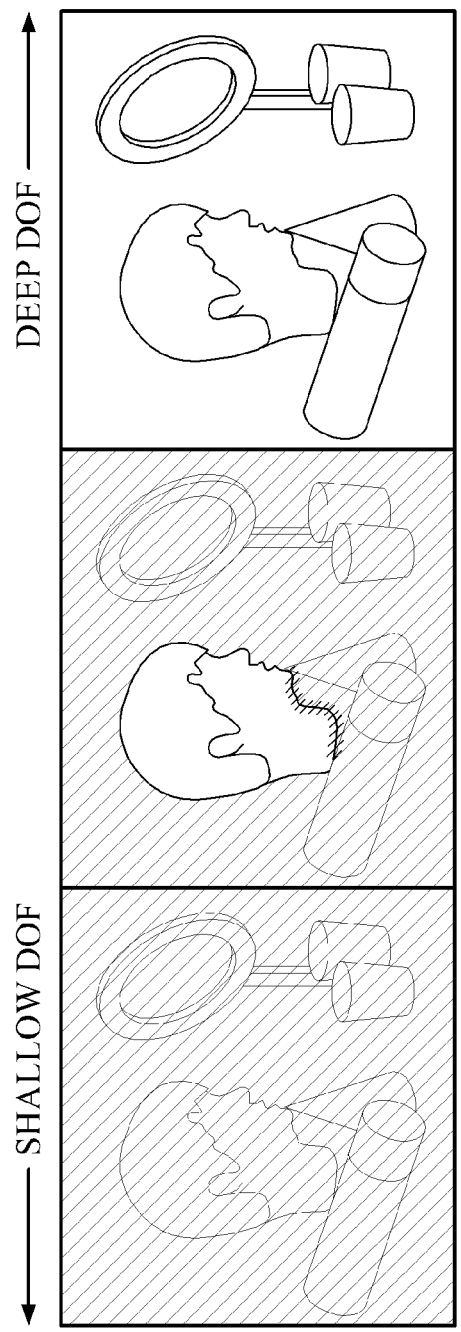

IMAGE PROCESSING APPARATUS AND METHOD

CROSS-REFERENCE TO RELATED APPLICATIONS

This application claims the priority benefit of Korean Patent Application No. 10-2013-0033186, filed on Mar. 28, 2013, in the Korean Intellectual Property Office, the disclosure of which is incorporated herein by reference.

BACKGROUND

1. Field

Example embodiments of the following disclosure relate to an apparatus and method for out-focusing a color image based on a depth image.

2. Description of the Related Art

A digital single-lens reflex (DSLR) camera captures an image in which an out-focus effect is reflected, by adjusting a focal length and a value of an aperture (F). Using the out-focus effect, an effect similar to a movement of an interest of a human from one object to another object may be produced.

A color-depth camera capable of photographing a color value and a depth value of an object may include a lens having an unchangeable focal length, so as to reduce a size of the camera. However, a user may still desire an out-focus effect which provides a sharp focus in a predetermined depth region.

Therefore, an improved image processing apparatus and method is desirable.

SUMMARY

The foregoing and/or other aspects are achieved by providing an image processing method, including receiving an input of a blur strength and a focal length of a region of interest (ROI) desired to be in focus for performing out-focusing, estimating a region having a depth value less than the focal length, based on a depth value of a depth image, and performing out-focusing on the ROI, by adjusting a color value of the ROI based on the blur strength and a color value of the region having the depth value less than the focal length.

The estimating may include estimating a region having a depth value greater than the focal length and a region having a depth value less than the focal length, based on the depth value of the depth image.

The performing may include calculating a color value of a first boundary formed between the ROI and the region having the depth value less than the focal length, by applying the blur strength and a first weight to the color value of the region having the depth value less than the focal length, and calculating a color value of a second boundary formed between the ROI and the region having the depth value greater than the focal length, by applying the blur strength and a second weight to the color value of the ROI.

The performing may include setting the first weight to a value greater than the second weight, and performing out-focusing for the second boundary to be sharper than the first boundary, using the calculated color value of the first boundary and the calculated color value of the second boundary.

The performing may include adjusting the color value of the ROI, by applying a weight to a color value of a neighboring pixel included in a window including a calculation pixel in a center. Here, the weight may be determined based on a difference between the focal length and a depth value of the calculation pixel, the blur strength, and a difference between the depth value of the calculation pixel and a depth value of the neighboring pixel.

The performing may include determining a weight to be inversely proportional to a difference between image coordinates of a calculation pixel and image coordinates of a neighboring pixel included in a window including the calculation pixel in a center, and to be proportional to a difference between the focal length and a depth value of the calculation pixel, and a difference between the depth value of the calculation pixel and a depth value of the neighboring pixel, and adjusting the color value of the ROI, by applying the determined weight to a color value of the neighboring pixel in a color image.

The method may further include receiving an input of a depth of field (DOF).

The method may further include determining a DOF weight to be proportional to the input DOF, and to be inversely proportional to the difference between the focal length and the depth value of the calculation pixel, and generating an out-focused color image capable of expressing the DOF, by applying the determined DOF weight to a color value of a pixel of the color image and a color value of a pixel of a color image in which the ROI is out-focused.

The generating may include generating the out-focused color image, by synthesizing the color value of the pixel of the color image with a result of applying the determined DOF weight to a value obtained by differentiating the color value of the pixel of the color image in which the ROI is out-focused from the color value of the pixel of the color image.

The method may further include determining a DOF weight to be proportional to the input DOF, and to be inversely proportional to the difference between the focal length and the depth value of the calculation, and the difference between the depth value of the calculation pixel and the depth value of the neighboring pixel, and generating an out-focused color image capable of expressing the DOF, by applying the determined DOF weight to a color value of a pixel of the color image and a color value of a pixel of a color image in which the ROI is out-focused.

The foregoing and/or other aspects are achieved by providing an image processing method, including receiving an input of a blur strength and a focal length of a ROI desired to be in focus for performing out-focusing, and performing out-focusing on the ROI in a color image, by applying a weight to a color value of a neighboring pixel included in a window including a calculation pixel in a center. Here, the weight may be determined based on the blur strength, and a difference between the focal length and a depth value of the calculation pixel.

The performing may include determining the weight to be inversely proportional to a difference between image coordinates of the calculation pixel and image coordinates of the neighboring pixel, and to be proportional to the difference between the focal length and the depth value of the calculation pixel, and calculating a color value of the calculation pixel, by applying the determined weight to the color value of the neighboring pixel in the color image.

The performing may include classifying a depth image into a first region of non-interest (RONI) having a depth value less than the focal length, and a second RONI having a depth value greater than the focal length, determining the weight to be inversely proportional to a difference between image coordinates of the calculation pixel and image coordinates of the neighboring pixel, and to be proportional to the difference between the focal length and the depth value of the calculation pixel, correcting the determined weight for a color value of a pixel corresponding to the first RONI in the color image to be reflected in calculation of a color value of the calculation pixel, when the depth value of the calculation pixel is greater than or equal to the depth value of the first RONI, and less than the depth value of the second RONI, and calculating the color value of the calculation pixel, by applying the corrected weight to the color value of the neighboring pixel in the color image.

The performing may include determining the weight to be inversely proportional to a difference between image coordinates of the calculation pixel and image coordinates of the neighboring pixel, and to be proportional to the difference between the focal length and the depth value of the calculation pixel, correcting the determined weight to be different values for a case in which the depth value of the calculation pixel is greater than or equal to the depth value of the neighboring pixel in the window, and for a case in which the depth value of the calculation pixel is less than the depth value of the neighboring pixel, and calculating the color value of the calculation pixel, by applying the corrected weight to the color value of the neighboring pixel in the color image.

The correcting may include correcting the determined weight to be a greater value for a case in which the depth value of the calculation pixel is greater than or equal to the depth value of the neighboring pixel, when compared to a case in which the depth value of the calculation pixel is less than the depth value of the neighboring pixel.

The method may include determining a DOF weight to be proportional to an input DOF, and to be inversely proportional to the difference between the focal length and the depth value of the calculation pixel, and generating an out-focused color image capable of expressing the DOF, by applying the determined DOF weight to a color value of a pixel of the color image and a color value of a pixel of a color image in which the ROI is out-focused.

The generating may include generating the out-focused color image, by synthesizing the color value of the pixel of the color image with a result of applying the determined DOF weight to a value obtained by differentiating the color value of the pixel of the color image in which the ROI is out-focused from the color value of the pixel of the color image.

The foregoing and/or other aspects are achieved by providing an image processing method, including receiving an input of a DOF, a blur strength, and a focal length of a ROI desired to be in focus for performing out-focusing, estimating a region having a depth value less than the focal length, based on a depth value of a depth image, performing out-focusing on the ROI, by adjusting a color value of the ROI based on the blur strength, and a color value of the region having the depth value less than the focal length, and generating an out-focused color image capable of expressing the DOF, by applying a DOF weight to a color value of a pixel of the color image and a color value of a pixel of a color image in which the ROI is out-focused. Here, the DOF weight may be determined to be proportional to the input DOF, and to be inversely proportional to a difference between a depth value of a calculation pixel and the focal length.

The foregoing and/or other aspects are achieved by providing an image processing apparatus, including an input unit to receive an input of a blur strength and a focal length of a ROI desired to be in focus for performing out-focusing, an estimator to estimate a region having a depth value less than the focal length, based on a depth value of a depth image, and a processor to perform out-focusing on the ROI, by adjusting a color value of the ROI based on the blur strength and a color value of the region having the depth value less than the focal length.

The estimator may estimate a region having a depth value greater than the focal length and a region having a depth value less than the focal length, based on the depth value of the depth image.

The processor may include a first calculator to calculate a color value of a first boundary formed between the ROI and the region having the depth value less than the focal length, by applying the blur strength and a first weight to the color value of the region having the depth value less than the focal length, and a second calculator to calculate a color value of a second boundary formed between the ROI and the region having the depth value greater than the focal length, by applying the blur strength and a second weight to the color value of the ROI.

The processor may set the first weight to a value greater than the second weight, and perform out-focusing for the second boundary to be sharper than the first boundary, using the calculated color value of the first boundary and the calculated color value of the second boundary.

The processor may include a weight determiner to determine a weight based on a difference between the focal length and a depth value of a calculation pixel, the blur strength, and a difference between the depth value of the calculation pixel and a depth value of a neighboring pixel included in a window including the calculation pixel in a center, and an adjuster to adjust the color value of the ROI, by applying the determined weight to a color value of the neighboring pixel.

The processor may include a weight determiner to determine a weight to be inversely proportional to a difference between image coordinates of a calculation pixel and image coordinates of a neighboring pixel included in a window including the calculation pixel in a center, and to be proportional to a difference between the focal length and a depth value of the calculation pixel, and a difference between the depth value of the calculation pixel and a depth value of the neighboring pixel, and an adjuster to adjust the color value of the ROI, by applying the determined weight to a color value of the neighboring pixel in a color image.

The input unit may receive an input of a DOF.

The apparatus may further include a DOF weight determiner to determine a DOF weight to be proportional to the input DOF received by the input unit, and to be inversely proportional to the difference between the focal length and the depth value of the calculation pixel, and a generator to generate an out-focused color image capable of expressing the DOF, by applying the determined DOF weight to a color value of a pixel of the color image and a color value of a pixel of a color image in which the ROI is out-focused.

The generator may generate the out-focused color image, by synthesizing the color value of the pixel of the color image with a result of applying the determined DOF weight to a value obtained by differentiating the color value of the pixel of the color image in which the ROI is out-focused from the color value of the pixel of the color image.

The apparatus may further include a DOF weight determiner to determine a DOF weight to be proportional to the input DOF, and to be inversely proportional to the difference between the focal length and the depth value of the calculation, and the difference between the depth value of the calculation pixel and the depth value of the neighboring pixel, and a generator to generate an out-focused color image capable of expressing the DOF, by applying the determined DOF weight to a color value of a pixel of the color image and a color value of a pixel of a color image in which the ROI is out-focused.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIGS. 12A and 12B illustrate a blur level to be applied based on a depth value by an image processing apparatus, according to example embodiments;

FIG. 13 illustrates out-focused images in which a depth of field (DOF) is reflected by an image processing apparatus, according to example embodiments;

DETAILED DESCRIPTION

Figure 1:
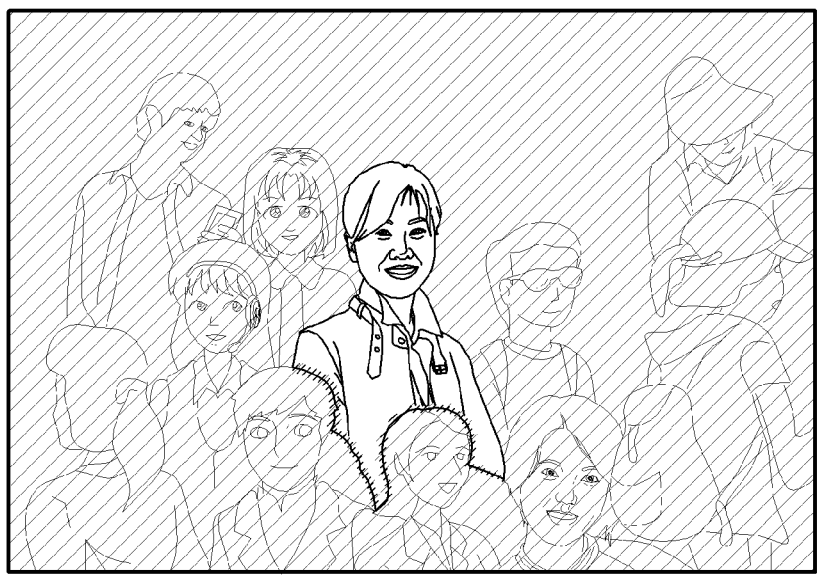
FIG. 1 illustrates an exemplary out-focused image.

Reference will now be made in detail to embodiments, examples of which are illustrated in the accompanying drawings, wherein like reference numerals refer to the like elements throughout. Embodiments are described below to explain the present disclosure by referring to the figures.

A depth image refers to an image representing a distance between an object located in a three-dimensional (3D) space and a camera capturing the object in black-and-white units, and a color image refers to an image representing information about a color of an object in each pixel.

A color-depth camera may use depth information to obtain an out-focused image that is captured by a typical digital single-lens reflex (DSLR) camera. To satisfy demands of users, a method of providing an out-focus effect to a color image using depth information may be suggested herein. The suggested method may provide the out-focus effect to the color image through image processing, and have an advantage in that the out-focus effect is freely applied to an image even after the image is already captured. For example, the color image may include a grayscale black-and-white image, and an image represented through three primary colors of red, green, and blue.

FIG. 1 illustrates an exemplary out-focused image.

Referring to FIG. 1, a region that a user is interested in is in focus, and thus, an out-focus effect is reflected in the image. As shown in FIG. 1, for example, a predetermined region of interest has a bold outline and is not hatched.

A typical DSLR camera may focus on the predetermined region of an object to be captured by adjusting a focal length of a lens and a value of an aperture, thereby capturing an image in which an out-focus effect is reflected. Analyzing the out-focus effect in the image, a boundary between an out-focused region and a region closer than the out-focused region may be more indistinct than a boundary between the out-focused region and a region farther than the out-focused region. In particular, the boundary between the out-focused region and the closer region may be more blurred. Accordingly, in order to provide an effect similar to an out-focus effect produced through an actual lens, such features described above are to be reflected.

Figure 2:
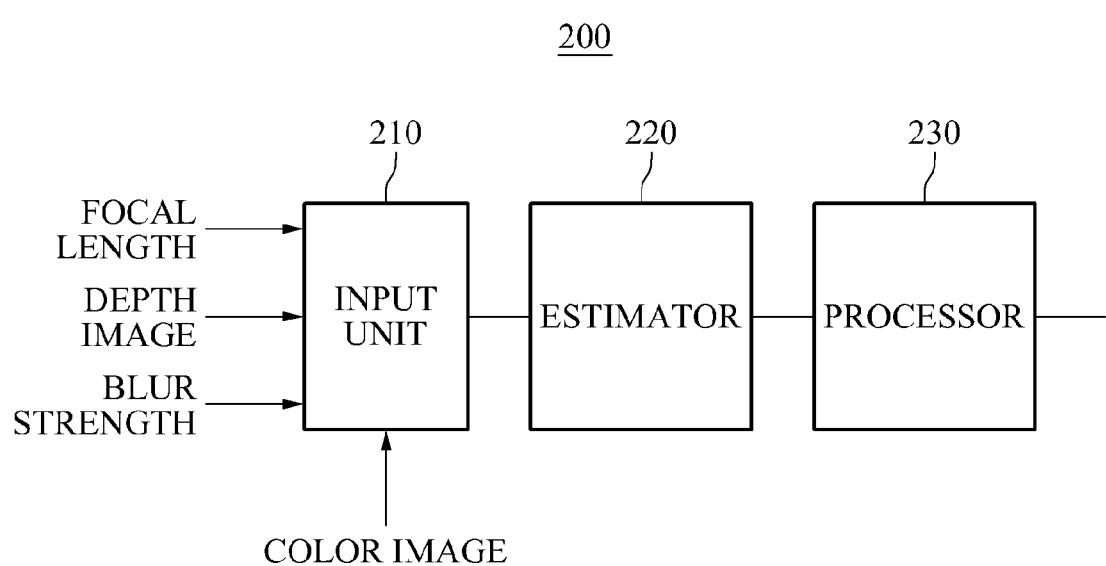
FIG. 2 illustrates a configuration of an image processing apparatus, according to example embodiments.

FIG. 2 illustrates a configuration of an image processing apparatus 200, according to example embodiments.

Referring to FIG. 2, the image processing apparatus 200 may include an input unit 210, an estimator 220, and a processor 230. Each of the input unit 210, the estimator 220, and the processor 230 may include at least one processing device.

The input unit 210 may receive an input of a color image and a depth image captured through a camera. For example, the depth image and the color image may be captured from an identical point of view, and have identical resolutions. In addition, the depth image and the color image may be captured by a single color-depth camera, or may be captured by a depth camera and a color camera, respectively.

In addition, the input unit 210 may receive an input of a focal length of a region of interest (ROI) desired to be in focus for performing an out-focusing effect. For example, the input unit 210 may receive the input of the focal length, directly or indirectly. As an example of the indirect input, the input unit 210 may receive the ROI desired to be in focus in the depth image, through a touch input. When a color-depth camera supports a touch interface, a user may set the ROI by touching a region desired to be in focus, through a touch screen. In this instance, a focal length, for example, a depth value, of the ROI set by the user may be automatically measured and reflected in the depth image. The use of a touch input is a non-limiting example, and thus, the present disclosure is not limited to receiving an ROI through a touch input.

A ROI refers to a region to be in focus through image processing. The ROI may be set in pixel units or in block units, each including a plurality of pixels, depending on a type of an interface supported by the input unit 210.

Further, the input unit 210 may receive an input of a blur strength. The blur strength refers to a degree in which a blur effect occurs. As the blur strength increases, a blur effect may occur more in a pixel.

The estimator 220 may estimate a region having a depth value less than the focal length of the ROI, based on a depth value of the depth image. As another example, the estimator 220 may estimate a region having a depth value greater than the focal length of the ROI and a region having a depth value less than the focal length of the ROI, based on the depth value of the depth image.

For example, the estimator 220 may estimate a region having a depth value less than the focal length of the ROI. In this example, a difference between the depth value and the focal length of the ROI is greater than a predetermined threshold value. In addition, the estimator 220 may estimate a region having a depth value greater than the focal length of the ROI. In this example, a difference between the depth value and the focal length of the ROI is greater than the predetermined threshold value.

The processor 230 may perform out-focusing on the ROI, by adjusting a color value of the ROI based on the blur strength, and a color value of the region having the depth value less than the focal length, estimated by the estimator 220.

For example, the color value of the ROI may be adjusted from a color value of an original color image to a color value of the ROI to be calculated by the processor 230. The processor 230 may calculate the color value of the ROI, by multiplying blur strength and a weight by a color value of the region having the depth value less than the focal length. For example, the weight may be determined based on a difference between the focal length and the depth value of the region less than the focal length.

Herein, a pixel of which a color value is to be calculated may be defined as a calculation pixel. The processor 230 may set a window including a calculation pixel in a center, and calculate a depth value of the calculation pixel by multiplying a weight by a color value of the neighboring pixel. For example, the weight may be proportional to the blur strength, and a difference between a depth value of a neighboring pixel in the window and the depth value of the calculation pixel. When the calculation pixel is included in the ROI, and the neighboring pixel is included in a region having a depth value less than the focal length, the processor 230 may set the weight to a greater value, when compared to a case in which the neighboring pixel is included in a region having a depth value greater than the focal length.

As another example, when the calculation pixel is included in the ROI, and the neighboring pixel is included in a region having depth value less than the focal length, the processor 230 may set the weight to be a greater value, when compared to a case in which the calculation pixel is included in a region having a depth value greater than the focal length, and the neighboring pixel is included in the ROI.

For example, the processor 230 may calculate the color value of the calculation pixel, using Equation 1 below. Equation1 also represents a linear filter.

$$\begin{bmatrix} r'_i \\ g'_i \\ b'_i \end{bmatrix} = \sum_{j \in W_i} w_{i,j} \begin{bmatrix} r_j \\ g_j \\ b_j \end{bmatrix}, \quad \text{[Equation 1]}$$

where $$\sum_{j \in W_i} w_{i,j} = 1$$

In Equation 1, i denotes a calculation pixel, j denotes a neighboring pixel, and $W_i$ denotes a window including the calculation pixel i in a center. $r_j$, and $g_j$, $b_j$ denote red (R), green (G), and blue (B) color values of the neighboring pixel j, respectively, before filtering is performed, and $r_i'$, $g_i'$, and $b_i'$ denote R, G, and B color values of the calculation pixel i, respectively, after the filtering is performed. $w_{i,j}$ denotes a weight determined based on a similarity between the calculation pixel i and the neighboring pixel j. The similarity between the calculation pixel i and the neighboring pixel j may be determined based on a distance between image coordinates of the calculation pixel i and image coordinates of the neighboring pixel j, a difference between a focal length and a depth value of the calculation pixel i, a blur strength, a result of comparing a depth value of the calculation pixel i to a depth value of the neighboring pixel j, and the like.

For example, $w_{i,j}$ of Equation 1 may be calculated using Equation 2 below.

$$w_{i,j} = \exp\left(-\frac{\|x_j - x_i\|^2}{2\sigma_i'^2}\right) \quad \text{[Equation 2]}$$

In Equation 2, $x_i$ denotes image coordinates of the calculation pixel i, and $x_j$ denotes image coordinates of the neighboring pixel j. $\sigma_i'$ be calculated using Equation 3 below.

$$\sigma_i' = \sum_{j \in W_i} w_{i,j}^g \sigma_i, \quad \text{[Equation 3]}$$

where $$\sum_{j \in W_i} w_{i,j}^g = 1,$$

$$w_{i,j}^g = \begin{cases} c & \text{if } z_i \geq z_j \\ 0 & \text{if } z_i < z_j \end{cases}$$

In Equation 3, $z_i$ denotes a depth value of the calculation pixel i, and $z_j$ denotes a depth value of the neighboring pixel j. When $z_i$ is greater than or equal to $z_j$ as a result of comparing $z_i$ to $z_j$, $w_{i,j}^g$ may have a weight c. When $z_i$ is less than $z_j$, $w_{i,j}^g$ may have a weight of "0".

$\sigma_i$ may be calculated using Equation 4 below.

$$\sigma_i = c_{blur} \cdot |z_i - z_f| \quad \text{[Equation 4]}$$

In Equation 4, $c_{blur}$ denotes the blur strength, and $z_f$ denotes the focal length.

The processor 230 may perform an overall control of the image processing apparatus, and perform functions of the input unit 210 and the estimator 220. Those elements are separately illustrated in FIG. 2 in order to describe each function separately. Thus, in implementing a product, the processor 230 may be configured to perform all of the functions, or may be configured to perform a portion of the functions.

The image processing apparatus may be provided in a color-depth camera. Accordingly, when a color image and a depth image are stored in the color-depth camera, an image in which an out-focus effect is reflected through image processing may be output from the camera.

FIGS. 3 through 10 illustrate various configurations of image processing apparatuses, according to other example embodiments.

Figure 3:
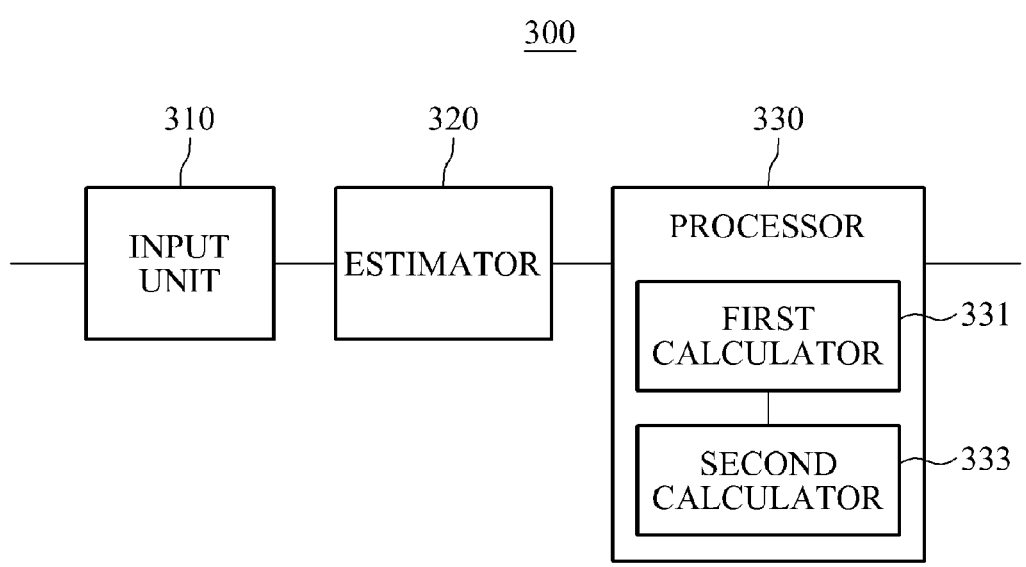
FIGS. 3 through 10 illustrate various configurations of image processing apparatuses, according to other example embodiments.

Referring to FIG. 3, an image processing apparatus 300 may include an input unit 310, an estimator 320, and a processor 330. Each of the input unit 310, the estimator 320, and the processor 330 may include at least one processing device.

The input unit 310 may receive an input of a color image and a depth image captured through a camera. In addition, the input unit 310 may receive an input of a focal length of a ROI desired to be in focus for performing out-focusing. Further, the input unit 310 may receive an input of a blur strength.

The estimator 320 may estimate a region having a depth value less than the focal length of the ROI, based on a depth value of the depth image. As another example, the estimator 320 may estimate a region having a depth value greater than the focal length of the ROI and a region having a depth value less than the focal length of the ROI, based on the depth value of the depth image.

The processor 330 may perform or produce an out-focusing effect on the ROI, by adjusting a color value of the ROI based on the blur strength, and a color value of the region having the depth value less than the focal length, estimated by the estimator 320.

For example, the processor 330 may include a first calculator 331 and a second calculator 333.

The first calculator 331 may calculate a color value of a first boundary formed between the ROI and the region having the depth value less than the focal length, by applying the blur strength and a first weight to the color value of the region having the depth value less than the focal length. The second calculator 333 may calculate a color value of a second boundary formed between the ROI and the region having the depth value greater than the focal length, by applying the blur strength and a second weight to the color value of the ROI. The color value of the first boundary may be calculated based on the color value of the region having the depth value less than the focal length, and the color value of the second boundary may be calculated based on the color value of the ROI.

For example, the processor 330 may set the first weight to a value greater than the second weight, and calculate the color value of the first boundary and the color value of the second boundary for the second boundary to be sharper than the first boundary after out-focusing is performed.

Further, the processor 330 may set the first weight to a value greater than the second value, thereby greatly reflecting the color value of the region having the depth value less than the focal length in calculation of the color value of the first boundary. The processor 330 may less reflect the color value of the ROI in calculation of the color value of the second boundary. Accordingly, the color value of the region having the depth value less than the focal length may be reflected greatly on the first boundary. Moreover, the color value of the ROI may be reflected less on the second boundary, such that the second boundary may be sharper than the first boundary.

Figure 4:
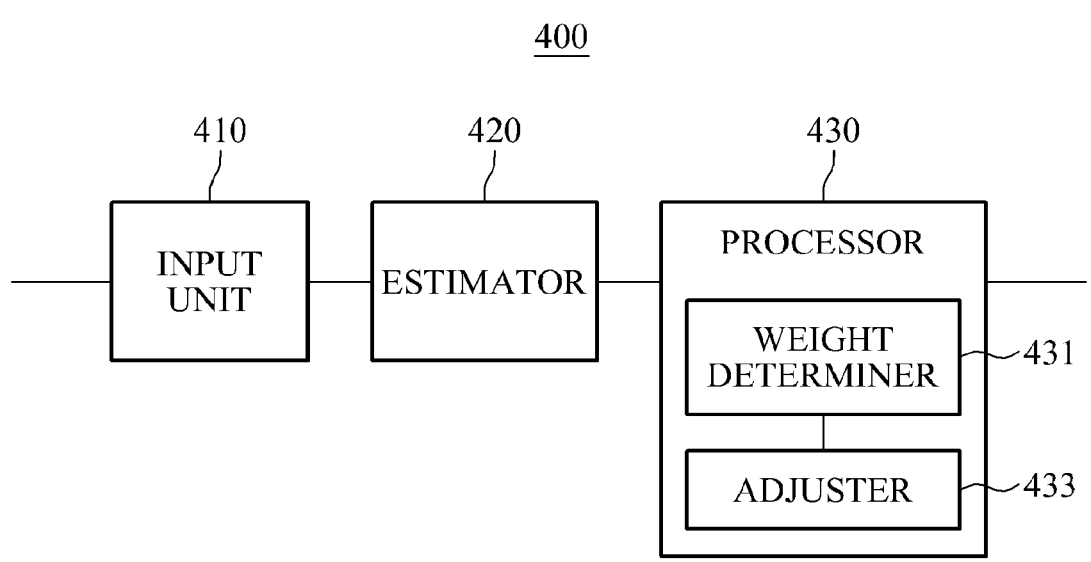

Referring to FIG. 4, an image processing apparatus 400 may include an input unit 410, an estimator 420, and a processor 430. Each of the input unit 410, the estimator 420, and the processor 430 may include at least one processing device.

The input unit 410 may receive an input of a color image and a depth image captured through a camera. In addition, the input unit 410 may receive an input of a focal length of a ROI desired to be in focus for performing out-focusing. Further, the input unit 410 may receive an input of a blur strength.

The estimator 420 may estimate a region having a depth value less than the focal length of the ROI, based on a depth value of the depth image. As another example, the estimator 420 may estimate a region having a depth value greater than the focal length of the ROI and a region having a depth value less than the focal length of the ROI, based on the depth value of the depth image.

The processor 430 may perform out-focusing on the ROI, by adjusting a color value of the ROI based on the blur strength, a difference between a depth value of a calculation pixel and a depth value of a neighboring pixel, the focal length, a color value of the region having the depth value greater than the focal length, and a color value of the region having the depth value less than the focal length, estimated by the estimator 420.

For example, the processor 430 may include a weight determiner 431, and an adjuster 433.

The weight determiner 431 may determine a weight based on a difference between a depth of a calculation pixel and a depth of a neighboring pixel included in a window including the calculation pixel at a center position, a blur strength, and a difference between the depth value of the calculation pixel and the focal length. The weight determiner 431 may determine the weight using Equation 2 described with reference to FIG. 2.

The weight determiner 431 may determine the weight to be inversely proportional to a difference between image coordinates of the neighboring pixel and image coordinates of the calculation pixel. Further, the weight determiner 431 may determine the weight to be proportional to a difference between the depth value of the calculation pixel and the depth value of the neighboring pixel, and a difference between the depth value of the calculation pixel and the focal length.

The adjuster 433 may adjust the color value of the ROI by applying the weight determined by the weight determiner 431 to the color value of the neighboring pixel in the color image. For example, the adjustment of the color value of the ROI may indicate calculating the color value of the ROI newly, by applying the weight to the color value of the neighboring pixel.

Figure 5:
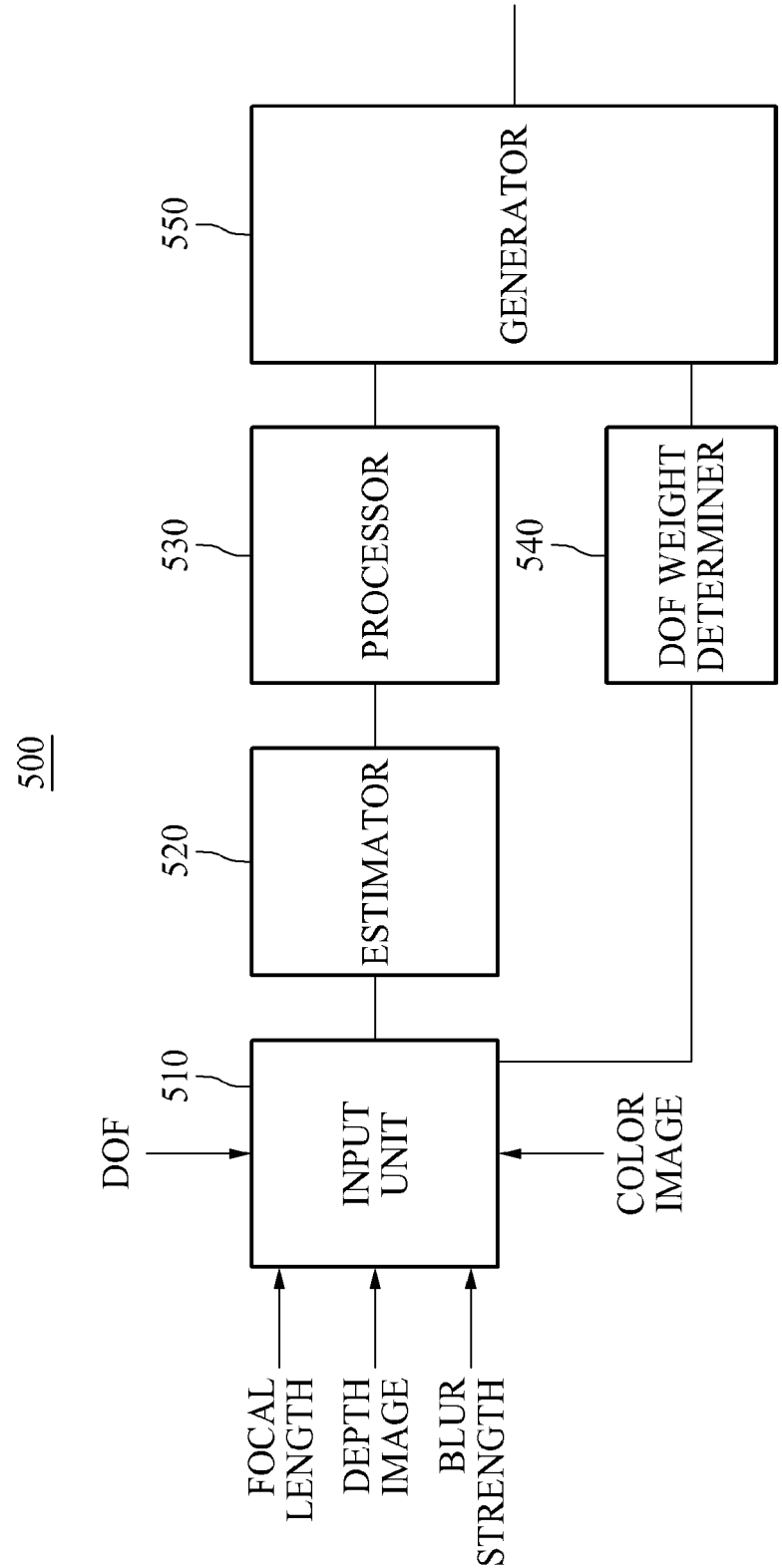

Referring to FIG. 5, an image processing apparatus 500 may include an input unit 510, an estimator 520, a processor 530, a depth of field (DOF) weight determiner 540, and a generator 550. Each of the input unit 510, the estimator 520, the processor 530, the depth of field (DOF) weight determiner 540, and the generator 550 may include at least one processing device.

The input unit 510 may receive an input of a color image and a depth image captured through a camera. The input unit 510 may also receive an input of a focal length of a ROI desired to be in focus for performing out-focusing. In addition, the input unit 510 may receive an input of a blur strength. Further, the input unit 510 may also receive an input of a DOF. The DOF may refer to a degree of breadth and narrowness in which a region to be in focus in the color image may narrow or broaden.

The estimator 520 may estimate a region having a depth value less than the focal length of the ROI, based on a depth value of the depth image. As another example, depending on embodiments, the estimator 520 may estimate a region having a depth value greater than the focal length of the ROI and a region having a depth value less than the focal length of the ROI, based on the depth value of the depth image.

The processor 530 may perform out-focusing on the ROI by adjusting a color value of the ROI based on the blur strength, and a color value of the region having the depth value less than the focal length, estimated by the estimator 520.

The DOF weight determiner 540 may determine a DOF weight to be proportional to the input DOF received by the input unit 510, and to be inversely proportional to a difference between a depth value of a calculation pixel and the focal length.

The generator 550 may generate an out-focused color image capable of expressing the DOF, by applying the DOF weight determined by the DOF weight determiner 540 to a color value of a pixel of the color image and a color value of a pixel of a color image in which the ROI is out-focused.

The generator 550 may generate the out-focused color image, using Equation 5 below.

$$\begin{bmatrix} r_i'' \\ g_i'' \\ b_i'' \end{bmatrix} = w_{dof} \begin{bmatrix} r_i \\ g_i \\ b_i \end{bmatrix} + (1 - w_{dof}) \cdot \begin{bmatrix} r_i' \\ g_i' \\ b_i' \end{bmatrix},$$ [Equation 5]

where $$w_{dof} = \exp\left(-\frac{\sigma_i'}{c_{dof}}\right)$$

In Equation 5, i denotes a calculation pixel. $r_i$, $g_i$, and $b_i$ denote R, G, and B color values of a color image in the calculation pixel i, respectively, and $r_i'$, $g_i'$, and $b_i'$ denote R, G, and B color values of a out-focused color image in the calculation pixel i, respectively. $r_i''$, $g_i''$, and $b_i''$ denote R, G, and B color values in the calculation pixel i of the out-focused color image in which the DOF is reflected. $W_{dof}$ denotes a weight determined based on the DOF $c_{dof}$. $W_{dof}$ may have a value proportional to the DOF $c_{dof}$ and a blur component $\sigma_i'$. $\sigma_i'$ may be calculated using Equation 3 described above.

For example, the generator 550 may generate the out-focused color image by synthesizing a color value of a pixel of the color image with a result of applying the DOF weight determined by the DOF weight determiner 540 to a value obtained by differentiating the color value of the pixel of the color image in which the ROI is out-focused from the color value of the pixel of the color image.

As another example, the generator 550 may generate the out-focused color image in which the DOF is expressed by synthesizing a color image of which all pixels are in focus with the color image in which the ROI is out-focused at a different ratio based on a difference between the depth value of the calculation pixel and the focal length.

In addition, the DOF weight determiner 540 may determine a DOF weight to be proportional to the input DOF, and to be inversely proportional to a difference between a depth value of a calculation pixel and a depth value of a neighboring pixel included in a window including the calculation pixel at a center position. Further, the weight determiner 540 may determine the DOF weight to be inversely proportional to a difference between the depth value of the calculation pixel and the focal length.

The generator 550 may generate an out-focused color image capable of expressing the DOF by applying the DOF weight determined by the DOF weight determiner 540 to a color value of a pixel of the color image and a color value of a pixel in a color image in which the ROI is out-focused by the processor 530.

Figure 6:
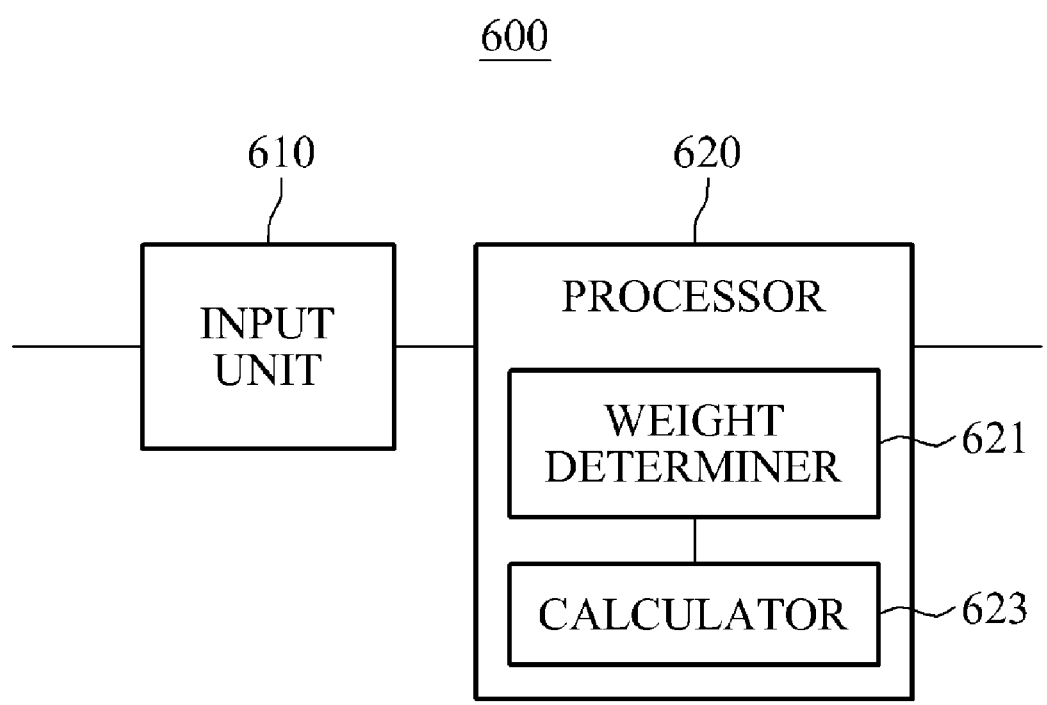

Referring to FIG. 6, an image processing apparatus 600 may include an input unit 610 and a processor 620. Each of the input unit 610 and the processor 620 may include at least one processing device.

The input unit 610 may receive an input of a blur strength, and a focal length of a ROI desired to be in focus for performing out-focusing.

The processor 620 may perform out-focusing on the ROI in a color image by applying a weight to a color value of a neighboring pixel included in a window including a calculation pixel at a center position. For example, the weight may be determined based on the blur strength and a difference between a depth value of the calculation pixel and the focal length. For example, the calculation pixel may be defined as a pixel of which a color value is to be calculated.

For example, the processor 620 may include a weight determiner 621 and a calculator 623. The weight determiner 621 may determine a weight to be inversely proportional to a difference between image coordinates of the calculation pixel and image coordinates of the neighboring pixel. Further, the weight determiner 621 may determine the weight to be proportional to a difference between the depth value of the calculation pixel and the focal length.

The weight determiner 621 may determine the weight, using Equation 6 below.

$$w_{i,j} = \exp\left(-\frac{\|x_j - x_i\|^2}{2\sigma_i^2}\right)$$ [Equation 6]

In Equation 6, i denotes a calculation pixel, j denotes a neighboring pixel, $x_i$ denotes image coordinates of the calculation pixel i, and $x_j$ denotes image coordinates of the neighboring pixel j. $\sigma_i$ denotes a parameter reflecting a blur strength, and may be calculated using Equation 4 described above.

The calculator 623 may calculate a color value of the calculation pixel by applying the weight determined by the weight determiner 621 to the color value of the neighboring pixel in the color image.

Figure 7:
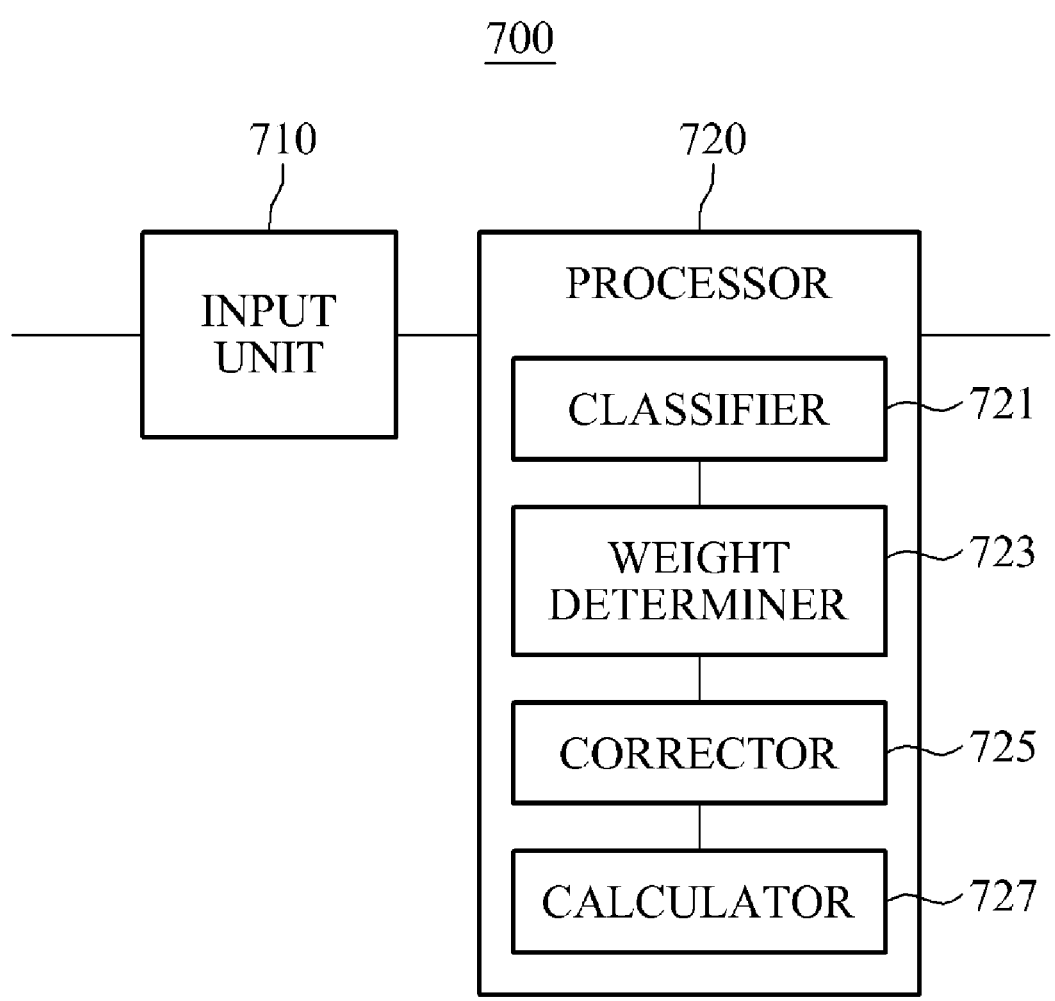

Referring to FIG. 7, an image processing apparatus 700 may include an input unit 710 and a processor 720. Each of the input unit 710 and the processor 720 may include at least one processing device.

The input unit 710 may receive an input of a blur strength and a focal length of a ROI desired to be in focus for performing out-focusing.

The processor 720 may perform out-focusing on the ROI in a color image by applying a weight to a color value of a neighboring pixel located in a window including a calculation pixel at a center position. For example, the weight may be determined based on the blur strength and a difference between a depth value of the calculation pixel and the focal length. For example, the calculation pixel may be defined as a pixel of which a color value is to be calculated.

For example, the processor 720 may include a classifier 721, a weight determiner 723, a corrector 725, and a calculator 727.

The classifier 721 may classify a depth image into a first region of non-interest (RONI) having a depth value less than the focal length, and a second RONI having a depth value greater than the focal length. The classifier 721 may classify the depth image into the first RONI and the second RONI, by comparing depth values of the depth image to the focal length.

The weight determiner 723 may determine a weight to be inversely proportional to a difference between image coordinates of the calculation pixel and image coordinates of the neighboring pixel. Further, the weight determiner 723 may determine a weight to be proportional to the difference between the depth value of the calculation pixel and the focal length.

The corrector 725 may correct the weight determined by the weight determiner 723 for a color value of a pixel corresponding to the first RONI in the color image to be reflected in calculation of a color value of the calculation pixel, when the depth value of the calculation pixel is greater than or equal to the depth value of the first RONI, and less than the depth value of the second RONI.

The calculator 727 may calculate a color value of the calculation pixel by applying the corrected weight to the color value of the neighboring pixel in the color image. The calculator 727 may apply the corrected weight to the color value of the pixel corresponding to the first RONI, thereby providing a blur effect more on a boundary between the ROI and the first RONI, when compared to a boundary between the ROI and the second RONI. The boundary between the ROI and the second RONI may become relatively sharp.

Figure 8:
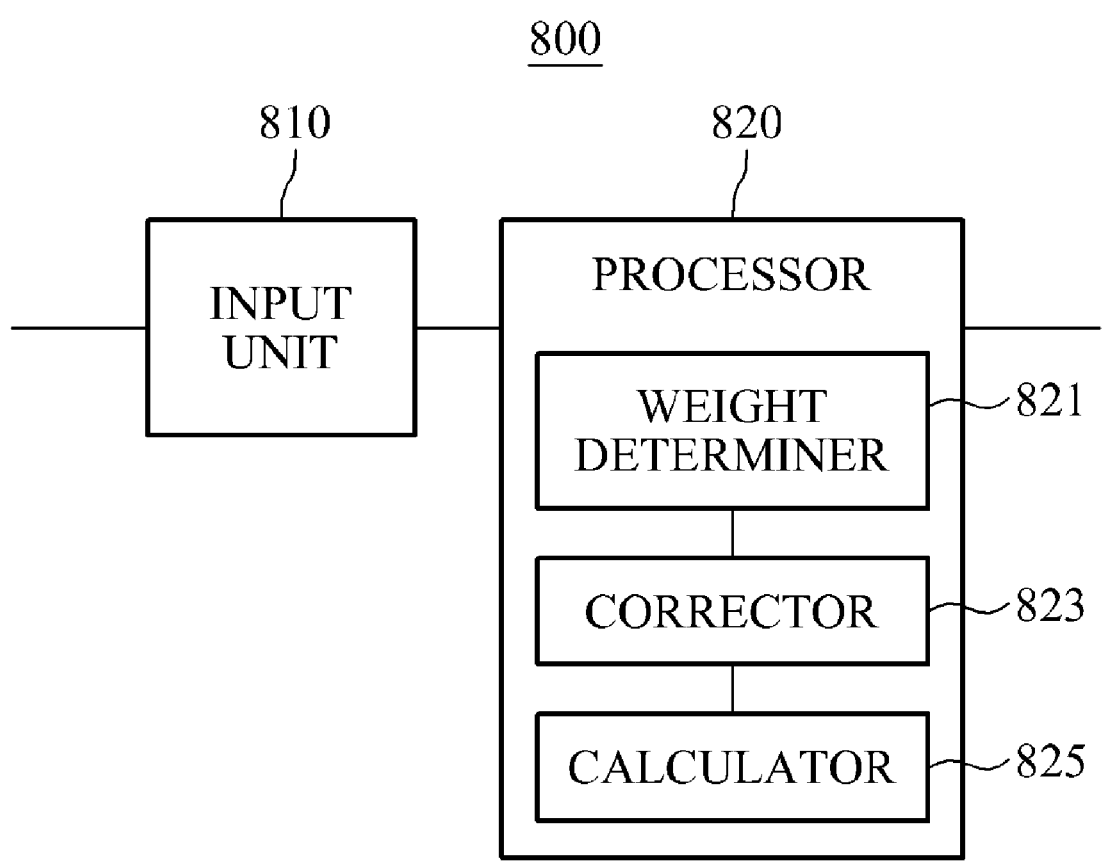

Referring to FIG. 8, an image processing apparatus 800 may include an input unit 810 and a processor 820. Each of the input unit 810 and the processor 820 may include at least one processing device.

The input unit 810 may receive an input of a blur strength, and a focal length of a ROI desired to be in focus for performing out-focusing. The processor 820 may perform out-focusing on the ROI in a color image, by applying a weight to a color value of a neighboring pixel included in a window including a calculation pixel in a center. Here, the weight may be determined based on the blur strength and a difference between a depth value of the calculation pixel and the focal length. For example, the calculation pixel may be defined as a pixel of which a color value is to be calculated.

For example, the processor 820 may include a weight determiner 821, a corrector 823, and a calculator 825.

The weight determiner 821 may determine a weight to be inversely proportional to a difference between image coordinates of the calculation pixel and image coordinates of the neighboring pixel, and to be proportional to a the difference between the depth value of the calculation pixel and the focal length.

The corrector 823 may correct the weight determined by the weight determiner 821 to be difference values for a case in which the depth value of the calculation pixel is greater than or equal to the depth value of the neighboring pixel in the window, and for a case in which the depth value of the calculation pixel is less than the depth value of the neighboring pixel.

In particular, the corrector 823 may correct the weight determined by the weight determiner 821 to be a greater value for a case in which the depth value of the calculation pixel is greater than or equal to the depth value of the neighboring pixel, when compared to a case in which the depth value of the calculation pixel is less than the depth value of the neighboring pixel.

For example, the case in which the depth value of the calculation pixel is greater than or equal to the depth value of the neighboring pixel may correspond to a case in which $z_i$ is greater than or equal to $z_j$ in Equation 3 where $z_i$ and $z_j$ are depth values. The case in which the depth value of the calculation pixel is less than the depth value of the neighboring pixel may correspond to a case in which $z_i$ is less than $z_j$ in Equation 3.

The calculator 825 may calculate a color value of the calculation pixel, by applying the corrected weight to the color value of the neighboring pixel in the color image.

Figure 9:
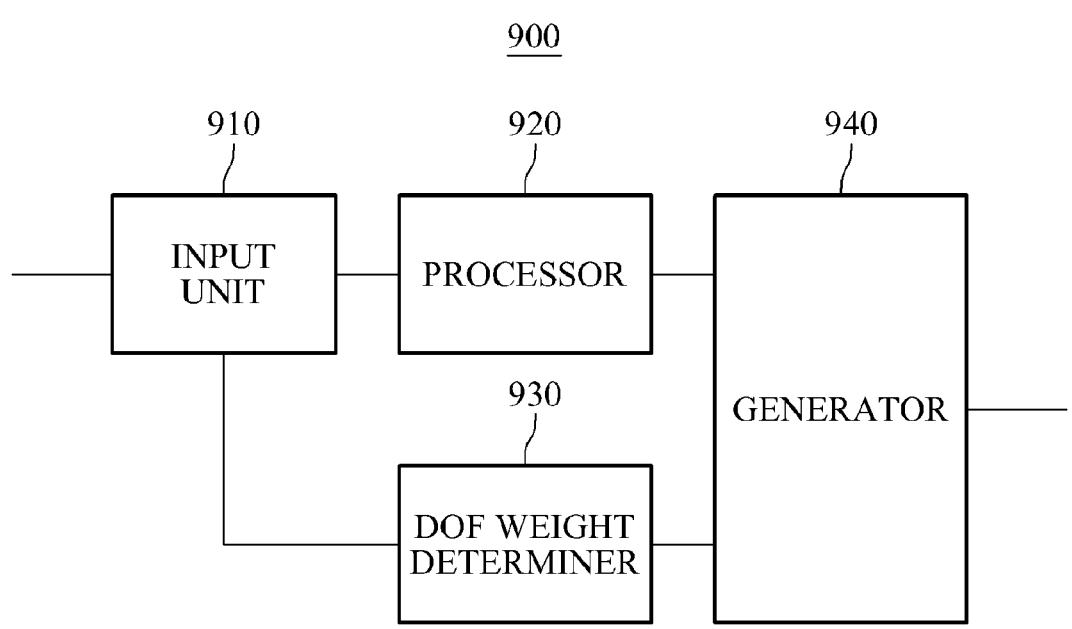

Referring to FIG. 9, an image processing apparatus 900 may include an input unit 910, a processor 920, a DOF weight determiner 930, and a generator 940. Each of the input unit 910, the processor 920, the DOF weight determiner 930, and the generator 940 may include at least one processing device.

The input unit 910 may receive an input of a blur strength and a focal length of a ROI desired to be in focus for performing out-focusing.

The processor 920 may perform out-focusing on the ROI in a color image by applying a weight to a color value of a neighboring pixel included or located in a window including a calculation pixel at a center position. For example, the weight may be determined based on the blur strength and a difference between a depth value of the calculation pixel and the focal length. For example, the calculation pixel may be defined as a pixel of which a color value is to be calculated.

The DOF weight determiner 930 may determine a DOF weight to be proportional to an input DOF, and to be inversely proportional to the difference between the depth value of the calculation pixel and the focal length.

The generator 940 may generate an out-focused color image capable of expressing the DOF by applying the DOF weight determined by the DOF weight determiner 930 to a color value of a pixel of the color image and a color value of a pixel of a color image in which the ROI is out-focused.

For example, the generator 940 may generate the out-focused color image by synthesizing the color value of the pixel of the color image with a result of applying the DOF weight determined by the DOF weight determiner 930 to a value obtained by differentiating the color value of the pixel of the color image in which the ROI is out-focused from the color value of the pixel of the color image.

Figure 10:
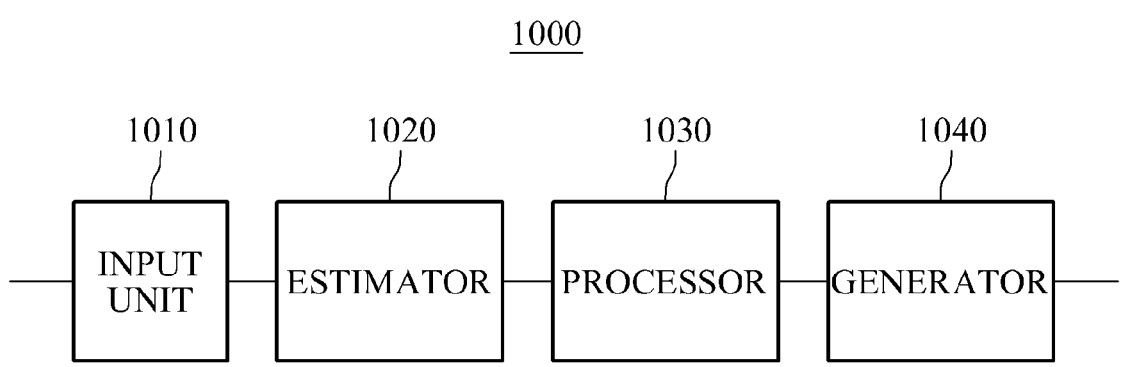

Referring to FIG. 10, an image processing apparatus 1000 may include an input unit 1010, an estimator 1020, a processor 1030, and a generator 1040. Each of the input unit 1010, the estimator 1020, the processor 1030, and the generator 1040 may include at least one processing device.

The input unit 1010 may receive an input of a DOF, a blur strength, and a focal length of a ROI desired to be in focus for performing out-focusing.

The estimator 1020 may estimate a region having a depth value less than the focal length, based on a depth value of a depth image.

The processor 1030 may perform out-focusing on the ROI, by adjusting a color value of the ROI based on the blur strength and a color value of the region having the depth value less than the focal length.

The generator 1040 may generate an out-focused color image capable of expressing the DOF, by applying a DOF weight to a color value of a pixel of a color image and a color value of a pixel of a color image in which the ROI is out-focused. For example, the DOF weight may be determined to be proportional to the DOF, and to be inversely proportional to a difference between a depth value of a calculation pixel and the focal length.

Figure 11A:
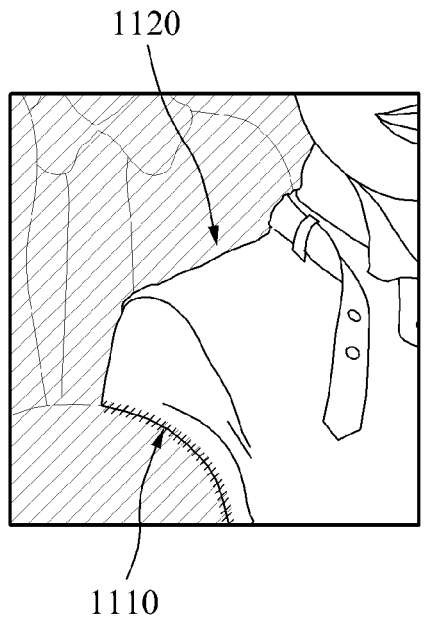
FIGS. 11A through 11C illustrate out-focused color images generated by an image processing apparatus, according to example embodiments.
Figure 11C:
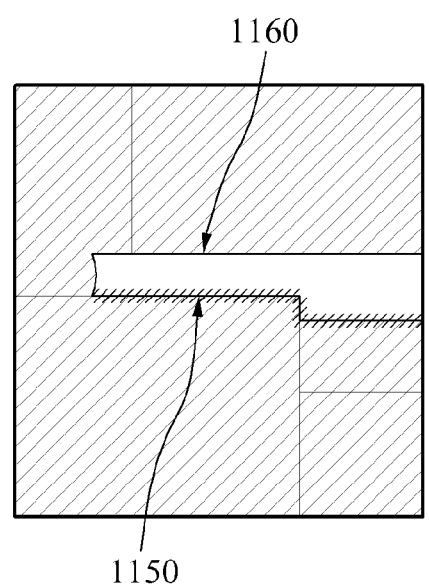
Figure 11B:
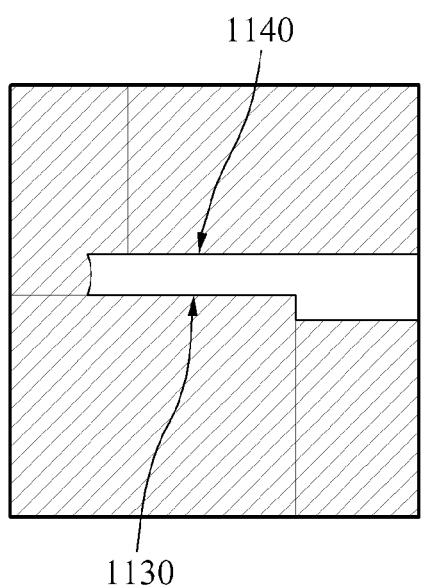

FIGS. 11A through 11C illustrate out-focused color images generated by an image processing apparatus according to example embodiments. Although shown in grayscale, each region may have a color value.

FIG. 11A illustrates an image out-focused by an actual lens. Referring to FIG. 11A, an out-focused portion in the image is represented without hatching, and a portion in which a blur effect occurs is represented with hatching. In an out-focused region, a boundary 1110 may be formed between a ROI and a foreground region, and a boundary 1120 may be formed between the ROI and a background region. The foreground region and the ROI, and the background region and the ROI may be distinguished based on distances between a lens of a camera and objects. The foreground region may affect the ROI on the boundary 1110, and thus, the blur effect may occur less, when compared to the boundary 1120. For example, in the image out-focused by the actual lens, the boundary 1120 may be sharper than the boundary 1110.

Referring to FIG. 11B, an out-focused color image generated by an image processing apparatus through post-processing, according to an example embodiment, is illustrated. Similar to FIG. 11A, an out-focused portion in the image is represented without hatching, and a portion in which a blur effect occurs is represented with hatching. A boundary 1130 may be formed between a ROI and a foreground region, and a boundary 1140 may be formed between the ROI and a background region. The color image of FIG. 11B may be generated using at least Equations 1, 4, and 6. As a weight decreases, a sharper color image may be generated. As the weight increases, a more blurred image may be generated. By increasing the weight as a difference between a depth value of a calculation pixel and a focal length increases, a more blurred color image may be generated as a difference from the focal length increases.

Referring to FIG. 11C, an out-focused color image generated by an image processing apparatus through post-processing, according to another example embodiment, is illustrated. Similar to FIG. 11A, an out-focused portion in the image is represented without hatching, and a portion in which a blur effect occurs is represented with hatching. A boundary 1150 may be formed between a ROI and a foreground region, and a boundary 1160 may be formed between the ROI and a background region. The color image of FIG. 11C may be generated using at least Equations 1 to 4. The boundary 1160 may be sharper than the boundary 1150. In particular, a color value of the foreground region may affect calculation of a color value of the ROI, and thus, a blur effect may occur partially on the boundary 1150. The boundary 1160 may be sharper than the boundary 1150 when an out-focus effect is reflected through a lens, as shown in FIG. 11A. Accordingly, the image processing apparatus may reflect the out-focus effect in the color image through the post-processing using software.

FIGS. 12A and 12B illustrate a blur level to be applied based on a depth value by an image processing apparatus, according to example embodiments.

Referring to a first graph (or a top graph) of FIG. 12A, when image coordinates move from "a" to "b", a depth value may be less than a focal length in a direction of "a" based on the focal length, and the depth value may be greater than the focal length in a direction of "b". Referring to a first depth image of FIG. 12B, since the depth value may be relatively small in the direction of "a" based on the focal length, dark colors may be used. Since the depth value may be relatively great in the direction of "b", a bright color may be used.

Referring to a second graph (or a middle graph) of FIG. 12A, an absolute value of a difference between a depth value and a focal length may be reflected, for a case in which at least Equations 1, 4, and 6 are used as described with reference to FIG. 11B. In a second depth image of FIG. 12B, a depth value of a region corresponding to the focal length may be relatively small, a dark color may be used. Since depth values may be relatively great in a direction of "a" and a direction of "b", a bright color may be used.

Referring to a third graph (or a bottom graph) of FIG. 12A, a depth value of a foreground region in a direction of "a" based on a focal length may affect a depth value of a ROI, and the depth value of the ROI may less affect a background region in a direction of "b", for a case in which at least Equations 1 to 4 are used as described with reference to FIG. 11C. In a third depth image of FIG. 12B, a blur effect may occur more on a boundary between the foreground region and the ROI, when compared to a boundary between the background region and the ROI. Accordingly, the boundary between the background and the ROI may be represented to be relatively sharp.

FIG. 13 illustrates out-focused images in which a DOF is reflected by an image processing apparatus according to example embodiments.

Referring to FIG. 13, in an image with a relatively deep DOF, a number of portions of a color image may be in focus.

In an image with a relatively shallow DOF, a blur effect may occur in a number of portions of a color image, and a portion being in focus may become narrow. The DOF may refer to a range of a depth in focus. As the DOF becomes deeper, the range of the depth in focus may become broader. As the DOF becomes shallower, the range of the depth in focus may become narrower. Again, as discussed above, an out-focused portion of an image is represented without hatching, and a portion in which a blur effect occurs is represented with hatching.

The image processing apparatus may perform out-focusing, and generate an out-focused color image in which a DOF is reflected, by synthesizing a color image with an out-focused color image at a different ratio, in view of a DOF weight.

The image processing apparatus may determine a DOF weight, and apply the DOF weight to the color image and the out-focused color image, thereby generating the out-focused color image of FIG. 13 in which the DOF is reflected based on the DOF weight, using Equation 5.

Figure 14:
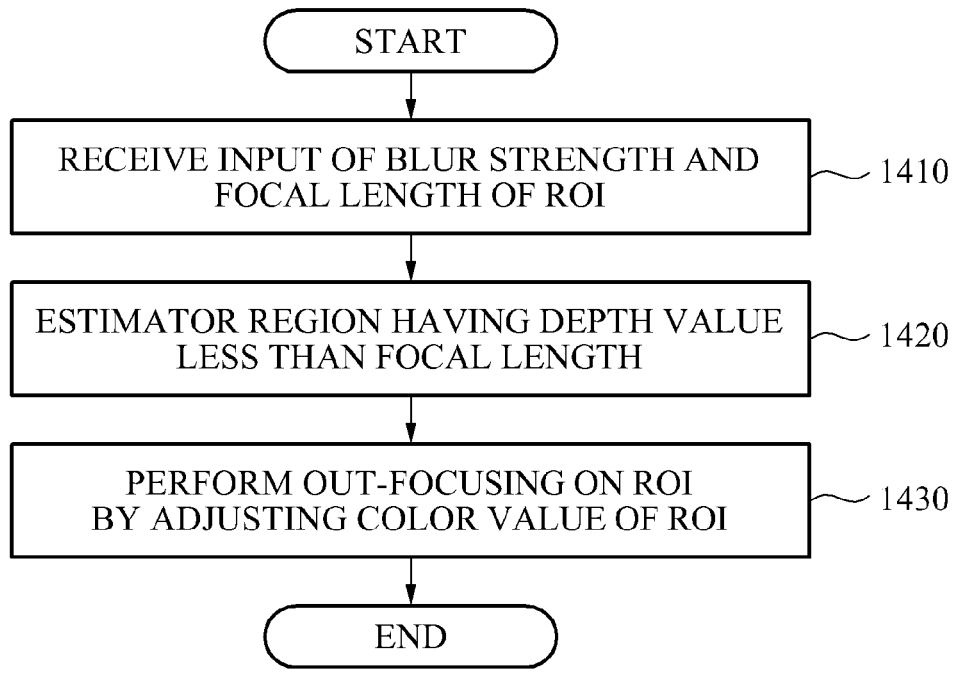
FIG. 14 is a flowchart illustrating an image processing method, according to example embodiments.
Figure 15:
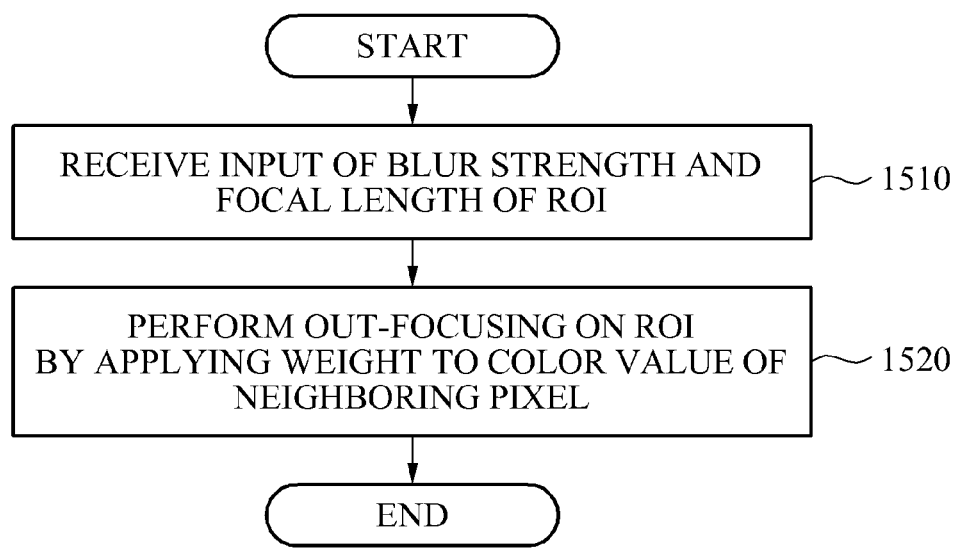
FIGS. 15 and 16 are flowcharts illustrating image processing methods, according to other example embodiments.
Figure 16:
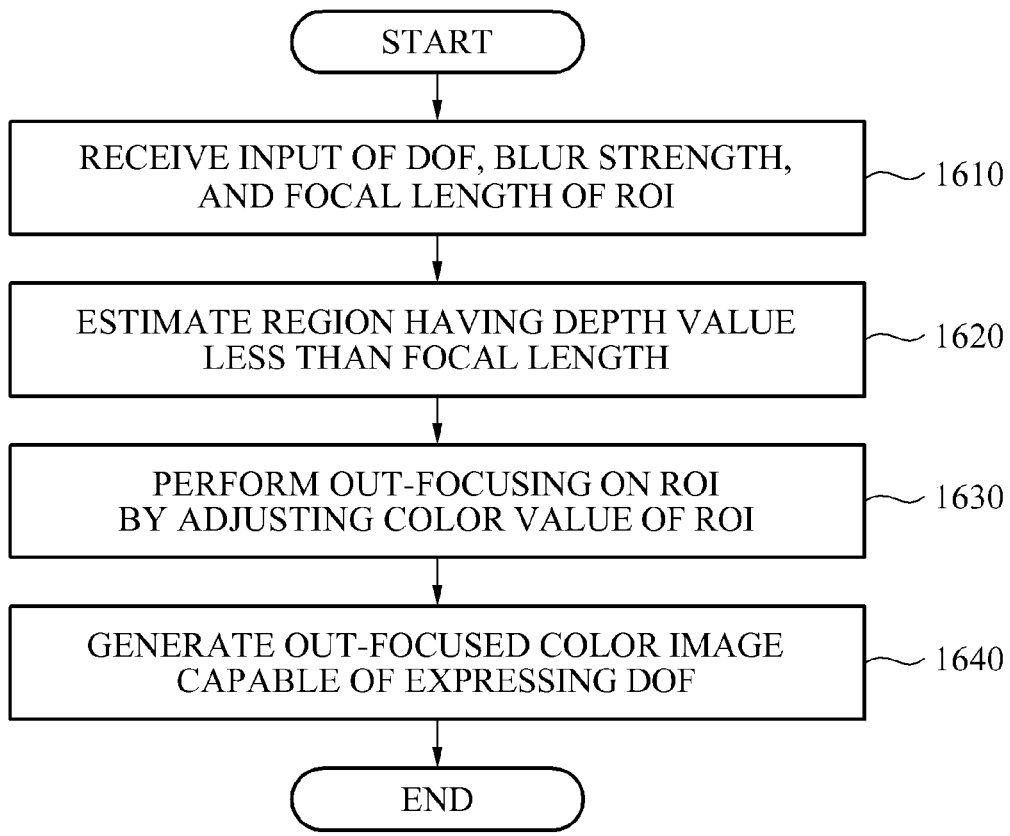

FIGS. 14 through 16 are flowcharts illustrating image processing methods corresponding to the image processing apparatuses of FIGS. 2, 6, and 10. Accordingly, the same descriptions provided with reference to FIGS. 2, 6, and 10 may apply to each operation of FIGS. 14 through 16.

For example, FIG. 14 is a flowchart illustrating an image processing method, according to example embodiments.

Referring to FIG. 14, in operation 1410, an input of a blur strength and a focal length of a ROI desired to be in focus for performing out-focusing may be received.

In operation 1420, a region having a depth value less than the focal length may be estimated based on a depth value of a depth image.

In operation 1430, out-focusing may be performed on the ROI, by adjusting a color value of the ROI based on the blur strength, and a color value of the region having the depth value less than the focal length.

FIGS. 15 and 16 are flowcharts illustrating image processing methods, according to other example embodiments.

Referring to FIG. 15, in operation 1510, an input of a blur strength and a focal length of a ROI desired to be in focus for performing out-focusing may be received.

In operation 1520, out-focusing may be performed on the ROI in a color image, by applying a weight to a color value of a neighboring pixel included or located in a window including a calculation pixel in a center. For example, the weight may be determined based on the blur strength, and a difference between a depth value of the calculation pixel and the focal length.

Referring to FIG. 16, in operation 1610, an input of a DOF, a blur strength, and a focal length of a ROI desired to be in focus for performing out-focusing may be received. For example, the DOF, blur strength, and focal length may be received by an input unit described above.

In operation 1620, a region having a depth value less than the focal length may be estimated based on a depth value of a depth image.

In operation 1630, out-focusing may be performed on the ROI, by adjusting a color value of the ROI based on the blur strength, and a color value of the region having the depth value less than the focal length.

In operation 1640, an out-focused color image capable of expressing the DOF may be generated by applying a DOF weight to a color value of a pixel of a color image and a color value of a pixel of a color image in which the ROI is out-focused. For example, the DOF weight may be determined to be proportional to the input DOF, and to be inversely proportional to a difference between a depth value of a calculation pixel and the focal length.

The example embodiments may include an image processing apparatus that may out-focus a color image based on a focal length of a ROI desired by a user to be out-focused, using a depth image and a color image already captured.

The example embodiments may also include an image processing apparatus that may filter a region having a depth value greater than a focal length of a ROI, and a region having a depth value less than the focal length, in different manners, thereby implementing an out-focus effect similar to an out-focus effect provided using a lens.

The example embodiments may also include an image processing apparatus that may generate a color image in which an out-focus effect and a DOF are reflected.

The example embodiments may also include an image processing apparatus that may acquire a color image similar to an image acquired using an actual lens, and have a rapid performance speed, when compared to a ray-tracing based algorithm.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the image processing apparatus, as described above, may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing method, comprising:
   receiving an input of a focal length of a region of interest (ROI);
   estimating at least one of a first region having a depth value less than the focal length and a second region having a depth value greater than the focal length, based on a depth value of a depth image; and
   performing out-focusing on the at least one of the first and second regions, by adjusting a color value of the at least one of the first and second regions based on a difference between the focal length and a depth value of a calculation pixel.

2. The method of claim 1, wherein the estimating comprises estimating both of the first region and the second region.

3. The method of claim 2, wherein the performing comprises:
   calculating a color value of a first boundary formed between the ROI and the first region having the depth value less than the focal length by applying a first weight to the color value of the region having the depth value less than the focal length; and
   calculating a color value of a second boundary formed between the ROI and the second region having the depth value greater than the focal length by applying a second weight to the color value of the ROI.

4. The method of claim 3, wherein the performing comprises setting the first weight to a value greater than the second weight, and performing out-focusing for the second boundary to be sharper than the first boundary, using the calculated color value of the first boundary and the calculated color value of the second boundary.

5. The method of claim 1, wherein the performing comprises adjusting the color value of the at least one of the first and second regions by applying a weight to a color value of a neighboring pixel included in a window including the calculation pixel at a center position,
   wherein the weight is determined based on a difference between the focal length and a depth value of the calculation pixel, a blur strength, and a difference between the depth value of the calculation pixel and a depth value of the neighboring pixel.

6. The method of claim 1, wherein the performing comprises:
   determining a weight to be inversely proportional to a difference between image coordinates of the calculation pixel and image coordinates of a neighboring pixel included in a window including the calculation pixel at a center position;
   determining the weight to be proportional to a difference between the focal length and a depth value of the calculation pixel, and a difference between the depth value of the calculation pixel and a depth value of the neighboring pixel; and
   adjusting the color value of the at least one of the first and second regions by applying the determined weight to a color value of the neighboring pixel in a color image.

7. The method of claim 1, further comprising:
   receiving an input of a depth of field (DOF).

8. The method of claim 7, further comprising:
   determining a DOF weight to be proportional to the input DOF, and to be inversely proportional to the difference between the focal length and the depth value of the calculation pixel; and
   generating an out-focused color image capable of expressing the DOF by applying the determined DOF weight to a color value of a pixel of the color image and a color value of a pixel of a color image in which the at least one of the first and second regions is out-focused.

9. The method of claim 8, wherein the generating comprises generating the out-focused color image by synthesizing the color value of the pixel of the color image with a result of applying the determined DOF weight to a value obtained by differentiating the color value of the pixel of the color image in which the at least one of the first and second regions is out-focused from the color value of the pixel of the color image.

10. The method of claim 7, further comprising:
    determining a DOF weight to be proportional to the input DOF, and
    determining the DOF weight to be inversely proportional to the difference between the focal length and the depth value of the calculation, and the difference between the depth value of the calculation pixel and the depth value of the neighboring pixel; and generating an out-focused color image capable of expressing the DOF by applying the determined DOF weight to a color value of a pixel of the color image and a color value of a pixel of a color image in which the at least one of the first and second regions is out-focused.

11. The method of claim 1, further comprising:
receiving an input of a blur strength, and
wherein the performing out-focusing on the at least one of the first and second regions comprising adjusting the color value of the at least one of the first and second regions based on the blur strength.

12. An image processing method, comprising:
receiving an input of a focal length of a region of interest (ROI), a first region and a second region; and
performing out-focusing on the at least one of the first and second regions in a color image by applying a weight to a color value of a neighboring pixel included in a window including a calculation pixel at a center position, wherein the weight is determined based on a difference between the focal length and a depth value of the calculation pixel.

13. The image processing method of claim 12, wherein the performing comprises:
determining the weight to be inversely proportional to a difference between image coordinates of the calculation pixel and image coordinates of the neighboring pixel, and
determining the weight to be proportional to the difference between the focal length and the depth value of the calculation pixel; and
calculating a color value of the calculation pixel by applying the determined weight to the color value of the neighboring pixel in the color image.

14. The image processing method of claim 12, wherein the performing comprises:
classifying a depth image into at least one of a first region of non-interest (RONI) having a depth value less than the focal length, and a second RONI having a depth value greater than the focal length;
determining the weight to be inversely proportional to a difference between image coordinates of the calculation pixel and image coordinates of the neighboring pixel, and to be proportional to the difference between the focal length and the depth value of the calculation pixel;
correcting the determined weight for a color value of a pixel corresponding to the first RONI in the color image to be reflected in calculation of a color value of the calculation pixel, when the depth value of the calculation pixel is greater than or equal to the depth value of the first RONI, and less than the depth value of the second RONI; and
calculating the color value of the calculation pixel by applying the corrected weight to the color value of the neighboring pixel in the color image.

15. The image processing method of claim 12, wherein the performing comprises:
determining the weight to be inversely proportional to a difference between image coordinates of the calculation pixel and image coordinates of the neighboring pixel, and to be proportional to the difference between the focal length and the depth value of the calculation pixel;

correcting the determined weight to be different values for a case in which the depth value of the calculation pixel is greater than or equal to the depth value of the neighboring pixel in the window, and for a case in which the depth value of the calculation pixel is less than the depth value of the neighboring pixel; and
calculating the color value of the calculation pixel by applying the corrected weight to the color value of the neighboring pixel in the color image.

16. The image processing method of claim 15, wherein the correcting comprises correcting the determined weight to be a greater value for a case in which the depth value of the calculation pixel is greater than or equal to the depth value of the neighboring pixel, when compared to a case in which the depth value of the calculation pixel is less than the depth value of the neighboring pixel.

17. The image processing method of claim 12, further comprising:
determining a depth of field (DOF) weight to be proportional to an input DOF, and to be inversely proportional to the difference between the focal length and the depth value of the calculation pixel; and
generating an out-focused color image capable of expressing the DOF by applying the determined DOF weight to a color value of a pixel of the color image and a color value of a pixel of a color image in which the at least one of the first and second regions is out-focused.

18. An image processing apparatus, comprising:
an input receiving processor configured to receive an input of a focal length of a region of interest (ROI);
an estimator processor configured to estimate at least one of a first region having a depth value less than the focal length, based on a depth value of a depth image; and
a processor configured to perform out-focusing on the at least one of the first and the second regions by adjusting a color value of the at least one of the first region and the second regions based on a difference between the focal length and a depth value of the calculation pixel.

19. The image processing apparatus of claim 18, wherein the estimator processor is configured to estimate both of the first region and the second region.

20. The image processing apparatus of claim 19, wherein the processor comprises:
a first calculator processor configured to calculate a color value of a first boundary formed between the ROI and the first region having the depth value less than the focal length by applying a first weight to the color value of the region having the depth value less than the focal length; and
a second calculator processor is configured to calculate a color value of a second boundary formed between the ROI and the second region having the depth value greater than the focal length by applying a second weight to the color value of the ROI.

21. The image processing apparatus of claim 20, wherein the processor is configured to set the first weight to a value greater than the second weight, and perform out-focusing for the second boundary to be sharper than the first boundary, using the calculated color value of the first boundary and the calculated color value of the second boundary.

22. The image processing apparatus of claim 18, further comprising a generator processor configured to generate an out-focused color image in which a depth of field (DOF) is expressed by synthesizing a color image of which all pixels are in focus with a color image in which the at least one of the first and second regions is out-focused at a different ratio based on a difference between a depth value of a calculation pixel and the focal length.

* * * * *